United States Patent
Namburu (10) Patent No.: US 9,730,307 B2
(45) Date of Patent: Aug. 8, 2017

(54) MULTI-COMPONENT ELECTRODE FOR A PLASMA CUTTING TORCH AND TORCH INCLUDING THE SAME

(71) Applicant: LINCOLN GLOBAL, INC., City of Industry, CA (US)

(72) Inventor: Praveen K. Namburu, Charleston, SC (US)

(73) Assignee: LINCOLN GLOBAL, INC., City of Industry, CA (US)

(*) Notice: Subject to any disclaimer, the term of this patent is extended or adjusted under 35 U.S.C. 154(b) by 418 days.

(21) Appl. No.: 14/465,765

(22) Filed: Aug. 21, 2014

(65) Prior Publication Data

US 2016/0057848 A1 Feb. 25, 2016

(51) Int. Cl.
| | |
|---|---|
| *H05H 1/34* | (2006.01) |
| *B23K 10/00* | (2006.01) |
| *H05H 1/28* | (2006.01) |

(52) U.S. Cl.
CPC .............. *H05H 1/34* (2013.01); *B23K 10/00* (2013.01); *B23K 10/003* (2013.01); *H05H 1/28* (2013.01); *H05H 2001/3442* (2013.01)

(58) Field of Classification Search
CPC .... H05H 1/34; H05H 1/28; H05H 2001/3442; B23K 10/003; B23K 10/00
USPC ............ 219/121.41, 121.44, 121.48, 121.49, 219/121.5, 121.52
See application file for complete search history.

(56) References Cited

U.S. PATENT DOCUMENTS

| | | |
|---|---|---|
| 4,967,055 A | 10/1990 | Raney et al. |
| 5,464,962 A | 11/1995 | Luo et al. |
| 5,601,734 A | 2/1997 | Luo et al. |
| 5,695,662 A | 12/1997 | Couch, Jr. et al. |
| 5,747,767 A | 5/1998 | Severance et al. |
| 5,756,959 A | 5/1998 | Freeman et al. |
| 5,767,478 A | 6/1998 | Walters |
| 5,841,095 A | 11/1998 | Lu et al. |
| 5,886,315 A | 3/1999 | Lu et al. |
| 5,977,510 A | 11/1999 | Lindsay |
| 5,994,663 A | 11/1999 | Lu |
| 6,020,572 A * | 2/2000 | Marner ............... H05H 1/34 219/121.52 |
| 6,066,827 A | 5/2000 | Nemchinsky |

(Continued)

FOREIGN PATENT DOCUMENTS

| | | |
|---|---|---|
| DE | 102004049445 A1 | 4/2006 |
| DE | 202006018163 U1 | 3/2007 |

(Continued)

OTHER PUBLICATIONS

International Application No. PCT/IB2015/001412, International Search Report & Written Opinion, 12 pages., Feb. 9, 2016.

(Continued)

*Primary Examiner* — Thien S Tran
(74) *Attorney, Agent, or Firm* — Perkins Coie, LLP.

(57) ABSTRACT

Embodiments of the present invention are directed to a plasma arc cutting torch and an electrode assembly used in the torch. The electrode assembly includes a high thermionic emissive insert and a high thermally conductive and high work function shell into which the insert is inserted. The shell aids in cooling the insert during operation and also has a design which ensures that the shell remains in a proper position during manufacture of the electrode assembly.

16 Claims, 4 Drawing Sheets

(56) References Cited

U.S. PATENT DOCUMENTS

| | | |
|---|---|---|
| 6,084,199 A | 7/2000 | Lindsay et al. |
| 6,114,650 A | 9/2000 | Marner et al. |
| 6,130,399 A | 10/2000 | Lu et al. |
| 6,207,923 B1 | 3/2001 | Lindsay |
| 6,403,915 B1 | 6/2002 | Cook et al. |
| 6,423,922 B1 * | 7/2002 | Nemchinsky ............ H05H 1/34 219/119 |
| 6,424,082 B1 | 7/2002 | Hackett et al. |
| 6,452,130 B1 | 9/2002 | Qian et al. |
| 6,483,070 B1 | 11/2002 | Diehl et al. |
| 6,614,001 B2 | 9/2003 | Hackett et al. |
| 6,686,559 B1 | 2/2004 | Walters et al. |
| 6,841,754 B2 | 1/2005 | Cook et al. |
| 6,946,617 B2 | 9/2005 | Brandt et al. |
| 6,969,819 B1 | 11/2005 | Griffin et al. |
| 7,019,255 B2 | 3/2006 | Brandt et al. |
| 7,081,597 B2 | 7/2006 | Severance, Jr. et al. |
| 7,193,174 B2 | 3/2007 | Brandt et al. |
| 7,256,366 B2 | 8/2007 | Severance et al. |
| 7,375,302 B2 | 5/2008 | Twarog et al. |
| 7,375,303 B2 | 5/2008 | Twarog et al. |
| 7,423,235 B2 | 9/2008 | Severance, Jr. et al. |
| 7,435,925 B2 | 10/2008 | Griffin et al. |
| 7,598,473 B2 | 10/2009 | Cook et al. |
| 7,605,340 B2 | 10/2009 | Duan et al. |
| 7,659,488 B2 | 2/2010 | Cook et al. |
| 7,754,993 B2 | 7/2010 | Ortega et al. |
| 7,829,816 B2 | 11/2010 | Duan et al. |
| 7,989,727 B2 | 8/2011 | Twarog et al. |
| 8,035,055 B2 | 10/2011 | Twarog et al. |
| 8,089,025 B2 | 1/2012 | Sanders et al. |
| 8,097,828 B2 | 1/2012 | Roberts et al. |
| 8,101,882 B2 | 1/2012 | Mather et al. |
| D654,104 S | 2/2012 | Fitzpatrick et al. |
| 8,115,136 B2 | 2/2012 | Mather et al. |
| 8,153,927 B2 | 4/2012 | Twarog et al. |
| 8,212,173 B2 | 7/2012 | Liebold et al. |
| 8,304,684 B2 | 11/2012 | Smith et al. |
| 8,338,740 B2 | 12/2012 | Liebold et al. |
| 8,389,887 B2 | 3/2013 | Currier et al. |
| 8,395,077 B2 | 3/2013 | Duan et al. |
| 8,525,069 B1 | 9/2013 | Mather et al. |
| 8,541,712 B2 | 9/2013 | Mather et al. |
| D692,402 S | 10/2013 | Dalton et al. |
| 8,546,718 B2 | 10/2013 | Mather et al. |
| 8,546,719 B2 | 10/2013 | Warren, Jr. et al. |
| 8,581,139 B2 | 11/2013 | Severance, Jr. et al. |
| 8,633,417 B2 | 1/2014 | Ashtekar et al. |
| 8,698,036 B1 | 4/2014 | Kornprobst et al. |
| 8,759,709 B2 | 6/2014 | Mather et al. |
| 8,772,667 B2 | 7/2014 | Yang et al. |
| 8,829,385 B2 | 9/2014 | Yang et al. |
| 2002/0185475 A1 | 12/2002 | Horner-Richardson et al. |
| 2004/0169018 A1 | 9/2004 | Brasseur et al. |
| 2006/0163216 A1 | 7/2006 | Brandt et al. |
| 2007/0125755 A1 * | 6/2007 | Mather .................... H05H 1/34 219/121.52 |
| 2012/0012560 A1 | 1/2012 | Roberts et al. |
| 2012/0222840 A1 * | 9/2012 | Huang ................ F28D 15/0275 165/104.26 |
| 2013/0043224 A1 | 2/2013 | Leiteritz et al. |
| 2013/0306607 A1 | 11/2013 | Mather et al. |
| 2014/0021175 A1 | 1/2014 | Chen et al. |
| 2014/0110382 A1 | 4/2014 | Beliveau et al. |

FOREIGN PATENT DOCUMENTS

| | | |
|---|---|---|
| EP | 0729805 A1 | 4/1996 |
| EP | 0790756 A2 | 8/1997 |
| WO | 9953734 A1 | 10/1999 |
| WO | 0028794 A1 | 5/2000 |
| WO | 2006113737 A2 | 10/2006 |
| WO | 2008101226 A1 | 2/2008 |
| WO | 2010111695 A1 | 9/2010 |
| WO | 2012118826 A1 | 9/2012 |
| WO | 2014187438 A1 | 11/2014 |

OTHER PUBLICATIONS

International Application No. PCT/IB2015/000683 International Search Report & Written Opinion, 12 pages, Aug. 31, 2015.
International Application No. PCT/IB2015/000702, International Search Report & Written Opinion, 14 pages, Aug. 25, 2015.
International Application No. PCT/IB2015/000714, International Search Report & Written Opinion, 10 pages, Aug. 31, 2015.
International Application No. PCT/IB2015/001694, International Search Report & Written Opinion, 14 pages, Dec. 23, 2015.

* cited by examiner

MULTI-COMPONENT ELECTRODE FOR A PLASMA CUTTING TORCH AND TORCH INCLUDING THE SAME

TECHNICAL FIELD

Devices, systems, and methods consistent with the invention relate to cutting, and more specifically to devices, systems and methods related to plasma arc cutting torches and components thereof, including a multi-component electrode for use in an arc plasma cutting torch.

BACKGROUND

In many cutting, spraying and welding operations, plasma arc torches are utilized. With these torches a plasma gas jet is emitted into the ambient atmosphere at a high temperature. The jets are emitted from a nozzle and as they leave the nozzle the jets are highly under-expanded and very focused. However, because of the high temperatures associated with the ionized plasma jet many of the components of the torch are susceptible to failure. This failure can significantly interfere with the operation of the torch and prevent proper arc ignition at the start of a cutting operation. Some torches utilize electrodes having an insert, in addition to a hafnium insert, in an effort to address these problems. An example of this is disclosed in U.S. Pat. No. 5,097,111, the entire disclosure of which is incorporated herein by reference. This patent explains the use of an additional insert within the electrode. However, this solution still does not alleviate the failure issues discussed above.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

An exemplary embodiment of the present invention is an electrode assembly and a plasma torch containing the same, where the electrode assembly contains an emissive insert and a shell surrounding the insert. The shell is made from a high thermally conductive material and a high work function material to aid in the cooling of the insert and prevent the jumping of an arc from the insert to the electrode body. The shell also contains at least one groove on its outside surface to secure the shell within the electrode body.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The present disclosure is generally directed to both air and liquid cooled plasma arc torches useful various cutting, welding and spraying operations. The construction and operation of these torches are generally known, and thus their detailed construction and operation will not be discussed herein. Further, embodiments of the present invention can be used in either handheld or mechanized plasma cutting operations. It should be noted that for purposes of brevity of clarity, the following discussion will be directed to exemplary embodiments of the present invention which are liquid cooled and can be used for both mechanized and hand geld cutting operations. However, embodiments of the present invention are not limited in this regard and embodiments of the present invention can be used in other types of welding and spraying torches without departing from the spirit or scope of the present invention. Further, various types and sizes of torches are possible at varying power levels if desired. The torches and components described herein could be used for marking, cutting or metal removal. Additionally, exemplary embodiments of the present invention, can be used with varying currents and varying power levels. The construction and utilization of coolant systems of the type that can be used with embodiments of the present invention are known and need not be discussed in detail herein.

Figure 1:
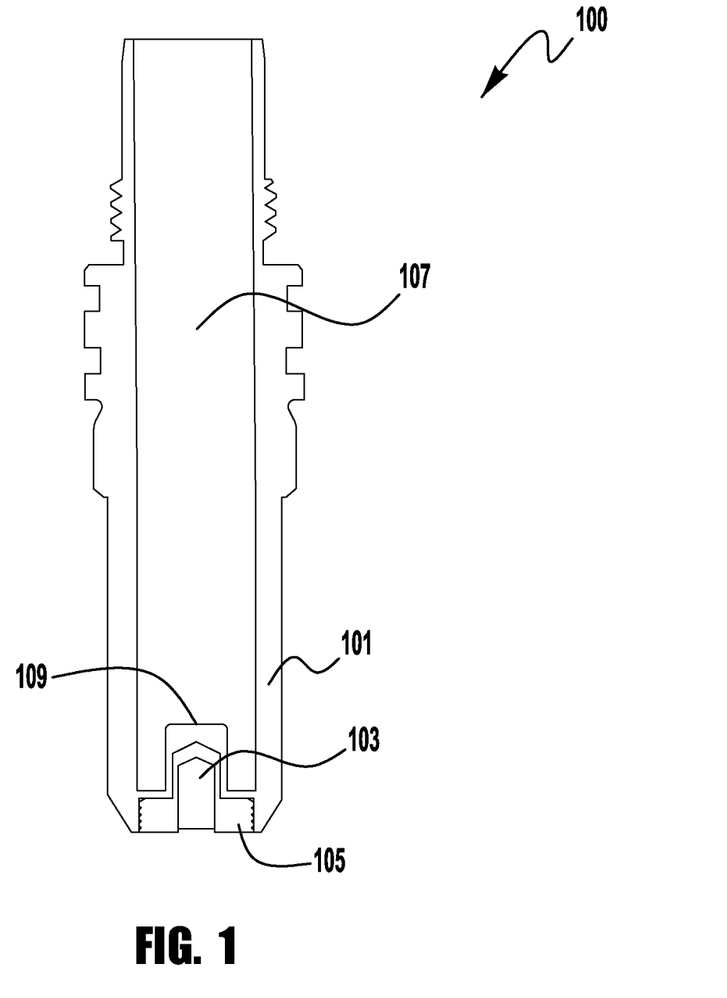
FIG. 1 is a diagrammatical representation of an exemplary multi-component electrode of the present invention.

Turning now to FIG. 1, an exemplary electrode 100 of the present invention is depicted. The use and construction of plasma cutting electrodes is generally well known and those details need not be discussed herein. As shown the electrode 100 has an electrode body 101 which is typically made up of copper, or other highly thermally conductive material, such as silver, gold, nickel, etc. The electrode 100 comprises a cooling cavity 107 in which a cooling medium can be directed to aid in cooling the electrode 100. At the distal end of the electrode 100, within the cavity 107 a protrusion portion 109 extends into the cavity 107, where the protrusion portion 109 extends out of the distal end surface 111 of the cavity 107. As discussed further below, the protrusion portion 109 contains a portion of the insert 103 and increases the surface cooling area within the cavity 107 of the electrode 100.

As mentioned above, the electrode 100 includes a high thermionic emissive insert 103. During cutting, the plasma jet emits from this insert. Often this insert 103 is made from hafnium, but other materials such as zirconium and tungsten (and other similar materials) can be used. Typically, the usable life of the electrode 100 depends on the usable life of the insert 103, which tends to erode during operation. Further, the erosion of the insert 103 can be accelerated if the cooling of the insert 103 and the electrode body 101 is not optimal. Also, the generated plasma jet can have a tendency to jump from the insert 103 and make contact with the distal end of the electrode body 101. This can cause damage to the electrode body 101 and accelerate its failure.

Therefore, embodiments of the present invention utilize a shell insert 105 which is inserted into the distal end of the electrode body 101, where the insert 103 is inserted into a cavity of the shell 105. In exemplary embodiments of the present invention, the shell 105 is made from a high heat transfer/high work function material, such as silver. By having a high heat transfer rate the shell 105 aids in optimizing the cooling of the insert 103, and by having a high work function the shell 105 aids in preventing the plasma jet from arcing between the end of the insert 103 and the copper electrode body 101. Thus, embodiments of the present invention have improved operating life over known electrodes.

Figure 2:
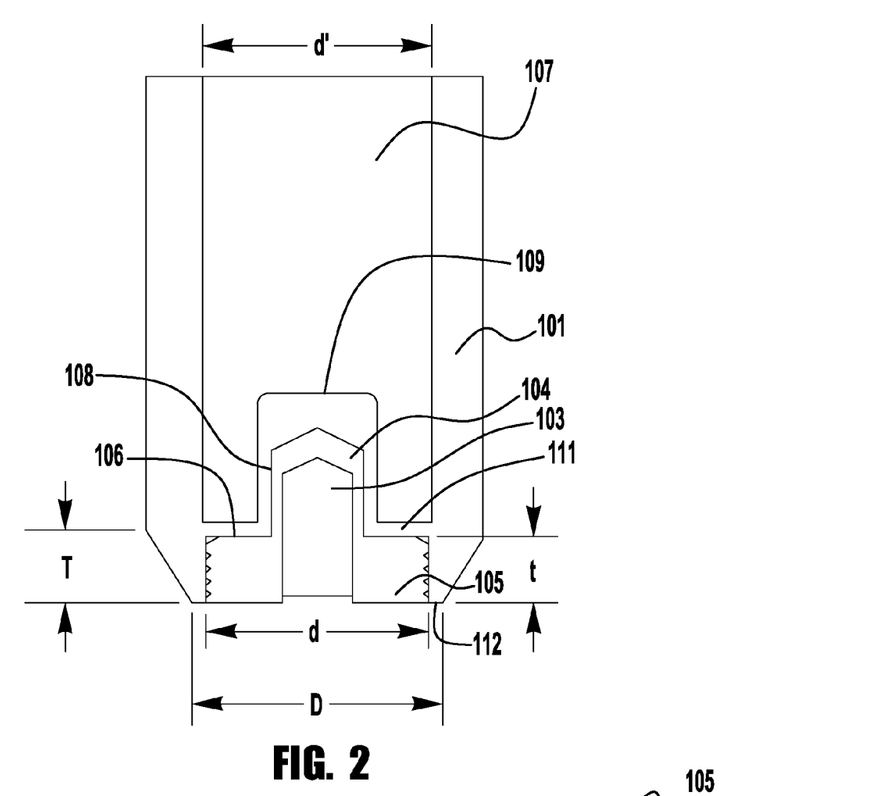
FIG. 2 is a diagrammatical representation of a portion of the electrode of FIG. 1.

FIG. 2 depicts a closer view of the distal end of the electrode 100 described above. As shown, the shell 105 is secured into a cavity 108 formed at the distal end of the electrode 100 such that the distal end surfaces of the shell 105 and the body 101 are generally coplanar. The shell 105 has a protrusion portion 104 which extends into the protrusion portion 109 of the electrode body 101, and has a main body portion 106 which has a larger diameter d than the protrusion portion 104. Both the protrusion and main body portions have a generally cylindrical outer shape. The main body portion 106 extends outward as shown such that its diameter d is close to the inner diameter d' of the cavity 107.

It should be noted that embodiments of the present invention can be used with cutting torches and systems that vary widely in the current and power levels. That is, embodiments of the present invention can be used in cutting system from below 100 amps to higher than 400 amps. However, because of the different demands put on consumables when operating at different current levels, the dimensional relationships of some of the components discussed herein can be optimized for different current levels. Therefore, for some of the physical relationships discussed herein, exemplary relationships will be discussed generally below. However, as shown later, more specific dimensional relationships for different current levels is shown in a Table.

Turning now to some of the exemplary dimensional relationships, in exemplary embodiments the diameter d is within the range of 90 to 110% the diameter d' of the cavity 107. In other exemplary embodiments, the diameter d is in the range of 90 to 100% of the diameter d' of the cavity 107. Also, as shown, the diameter d of the main body portion 106 is such that the distal face of the surface area of the electrode 100 is primarily the shell 105. For example, in exemplary embodiments of the present invention the diameter d of the main body portion 106 is in the range of 80 to 98% of the diameter D of the distal face 112 of the electrode 100, where the distal face 112 is the circular flat face of the electrode 100. In other exemplary embodiments, the diameter d is in the range of 85 to 90% of the diameter D of the face 112. By having the shell 105 is a larger diameter in the electrode distal end face, embodiments aid in preventing the arc from jumping between the insert 103 and the electrode body 101. Known electrodes do not have shell with such a large relative diameter.

Also, as shown, the shell main body portion 106 has a thickness t which is much thicker than known electrode configurations. That is, the main body portion has a thickness t which is in the range of 75 to 95% of the thickness T—which is measured from the distal face 112 of the electrode 100 to the cavity surface 111. In other exemplary embodiments, the thickness t is in the range of 79 to 90%. By using such a large thickness the overall volume of the shell is optimized, which optimizes the heat transfer of the shell and the arc stabilization. Thus, operational life improvements are achieved over know electrodes.

When assembling/manufacturing exemplary embodiments of the electrode 100 the insert 103 is inserted into a cavity 305 (see FIG. 3) in the shell 105 and the shell 105 is inserted into the cavity 108 in the electrode body 101. Then a radially directed compressive force is applied on the sides the electrode body 101 at the distal end such that the shell 105 and insert 103 are crimped into the electrode body 101 and held in place by this crimp force. The radial crimping force is applied such that the outside diameter of the electrode body 101 at the crimp force location is reduced by about 3 to 8%.

Figure 3:
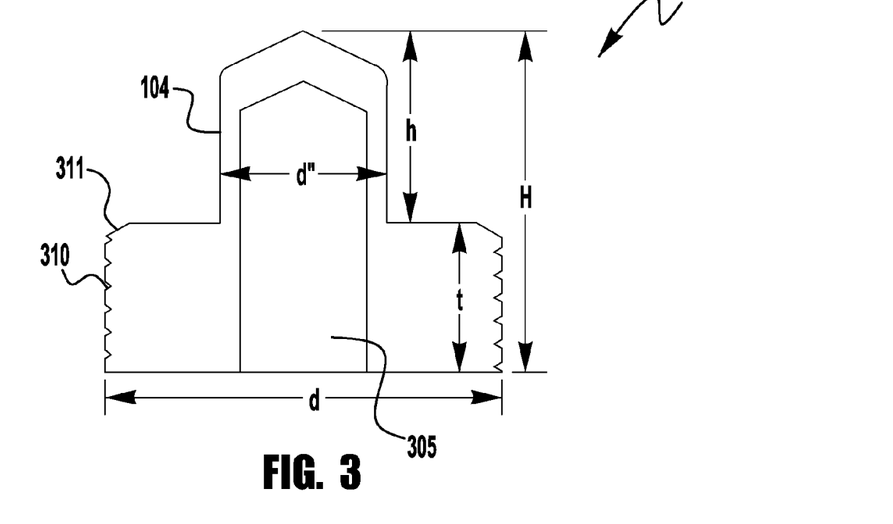
FIG. 3 is a diagrammatical representation of an exemplary electrode insert in accordance with an embodiment of the present invention.

FIG. 3 depicts an exemplary embodiment of the shell 105 of the present invention. As shown, exemplary embodiments of the shell 105 have a number of grooves 310 around the outer surface of the main body portion 106. The grooves 310 aid in securing the shell 106 in the cavity 108 of the electrode body 101, as well as aiding in the heat transfer between the shell 105 and the body 101. As described above, in exemplary embodiments, the shell 105 is crimped within the electrode body 101. This crimping is done with sufficient force such that with known configurations any insert/component within the electrode body has a tendency to squeeze out of the electrode body during manufacture. Embodiments of the present invention prevent this issue by using the grooves 310. That is, the grooves 310 engage with the inner wall of the cavity 108 such that the grooves 310 aid in preventing the shell 105 from squeezing out of the cavity 108 during assembly of the electrode 100. Further, the grooves 310 increase the overall surface area of the main body portion 106. When the electrode body 101 is crimped onto the shell 105 the material of the electrode body 101 is compressed into the grooves 310. In some embodiments, the compression is such that no space is left between the shell 105 and the body 101 at the grooves 310. When the material of the body 101 is compressed into the grooves 310 this increases the overall surface contact between the shell 105 and the electrode body 101. This increase the contact surface area which thus increases the heat transfer between the shell 105 and the body 101 and thus aids in improving the operational life of the electrode 100.

In exemplary embodiments the grooves 310 are separate grooves which are essentially rings around the shell 105. However, the grooves 310 need not be limited in this way. For example, the grooves 310 can be a single spiral or thread type groove. Further, other groove configurations can be used without departing from the spirit or scope of the present invention. For example, the grooves 310 need not be completely concentric, rather the grooves can be a plurality of depressions or notches in the surface shell 105, which will still achieve the above desired functionality. Embodiments of the present invention can also use different cross-sectional shapes for the grooves 310. For example, the grooves 310 can be V-shaped, U-shaped, etc. Additionally, in some exemplary embodiments the grooves 310 can have the same dimensions (depth, width, etc.) whereas in other exemplary embodiments the shape/dimensions of the grooves 310 can vary. For example, in some exemplary embodiments, the grooves 310 nearest the distal end of the electrode can be deeper/larger than the grooves 310 furthest from the distal end. Other varying configurations can be used without departing from the spirit or scope of the present invention.

Further, it should be noted that while the above discussion references "grooves", it should be understood that the above equally applies to embodiments where a single, spiral groove 310 is used, where such a grooves can have varying shape/dimensions along its length.

In exemplary embodiments of the present invention, the shell 105 contains between 1 and 12 separate grooves 310 on an outer surface. In further exemplary embodiments, the shell 105 contains between 4 and 10 separate grooves 310. It should also be noted that while the FIG. 3 embodiment depicts grooves 310 in the surface of the shell 105, a plurality of protrusions can be formed on the surface of the shell 105 to achieve the benefits discussed above.

In exemplary embodiments of the present invention, the grooves 310 have a depth in the range of 0.004 to 0.012". In further exemplary embodiments, the grooves 310 have a depth in the range of 0.005 to 0.008". Of course, other groove depths can be used, however, if the groove depth is too shallow the grooves may not provide the grip benefits described above, or if the grooves depths are too deep, then the cooper of the electrode body 101 may not fully penetrate the grooves during the crimp phase—and can leave gaps. In some exemplary embodiments all of the grooves 310 have the same depth, while in other exemplary embodiments, the depth of the grooves can vary.

Also, as shown in FIG. 3, the shell can contain an angled or shaped corner 311 at the interior edge of the main body portion 106 as shown. This corner 311 can be angled or rounded.

Additionally, in exemplary embodiments of the present invention, the protrusion portion 104 has a height h which is in the range of 55 to 80% of the overall height H of the shell 105. In other exemplary embodiments the height h is in the range of 60 to 75%. Further, the diameter d" of the protrusion portion 104 of the shell is in the range of 33 to 60% of the overall diameter d of the shell. In further exemplary embodiments, the diameter d" is in the range of 38 to 50% of the diameter d. With these overall dimensions the volume and integrity of the shell 105 are optimized while also ensuring minimizing the possibility of arc jump between the insert 103 and the electrode body 101.

Further, in exemplary embodiments of the present invention it is the electrode body 101 is made from an oxygen-free high thermal conductivity copper. Such copper alloys typically are 99.99% pure copper with a low oxygen content of no more than 0.0005% by weight. An example of such a copper alloy is C10100. A copper of this alloy provides the heat transfer characteristics that are desirable but is also susceptible to machining and crimping—so as to be crimped with the grooves in the shell.

Figure 4:
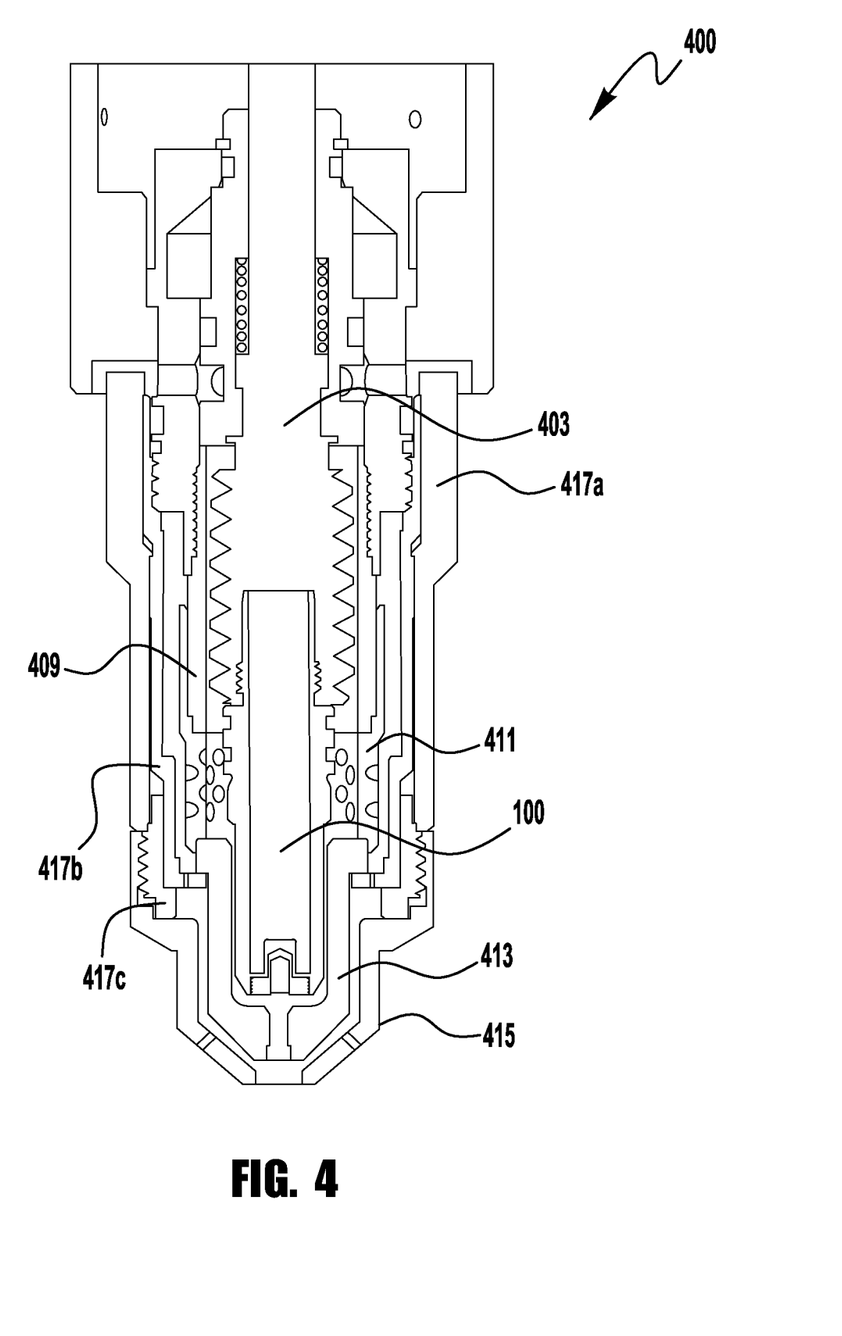
FIG. 4 is a diagrammatical representation of an exemplary plasma arc cutting torch utilizing the electrode of FIG. 1.

Turning now to FIG. 4, a torch assembly 400 is shown which utilizes an exemplary electrode 100 of the present invention. As mentioned previously, the torch 400 can be any type of known plasma arc cutting torch including, but not limited to air cooled, liquid cooled, contact start, non-contact start, high current, low current, handheld and/or mechanized. Embodiments of the present invention are not limited in this regard. Further, because the general construction and operation of such torches is known, those details need not be discussed herein. As shown in FIG. 4, an exemplary torch 400 can include the electrode assembly 100 discussed herein, and components such as a shield cap 415, nozzle 413, swirl ring 411, a cathode body 403, to which the electrode 100 is secured—often by threads at the electrode assembly 100. The torch can also include components such as an isolator structure 409 and a retaining cap assembly 417a-417c which aids in securing the shield 415 and nozzle 413 to the torch 400. As is generally understood, the insert 103 emits the plasma jet/arc which exits through an opening in the nozzle 413 and then out through an opening in the shield cap 415. Further, a shield gas can be provided to the torch, which is then passed between the nozzle 413 and shield cap 415 to also be ejected through an opening at the distal end of the shield cap 415.

The operation of the torch assembly 400, using the exemplary electrode assembly 100 is no different than the operation of known torches. However, because of the attributes discussed above, the electrode assembly 100 will have a longer life than known electrodes and is easier to manufacture with a high level of consistency. Therefore, embodiments of the present invention provide significant improvements over known electrodes.

Figure 5:
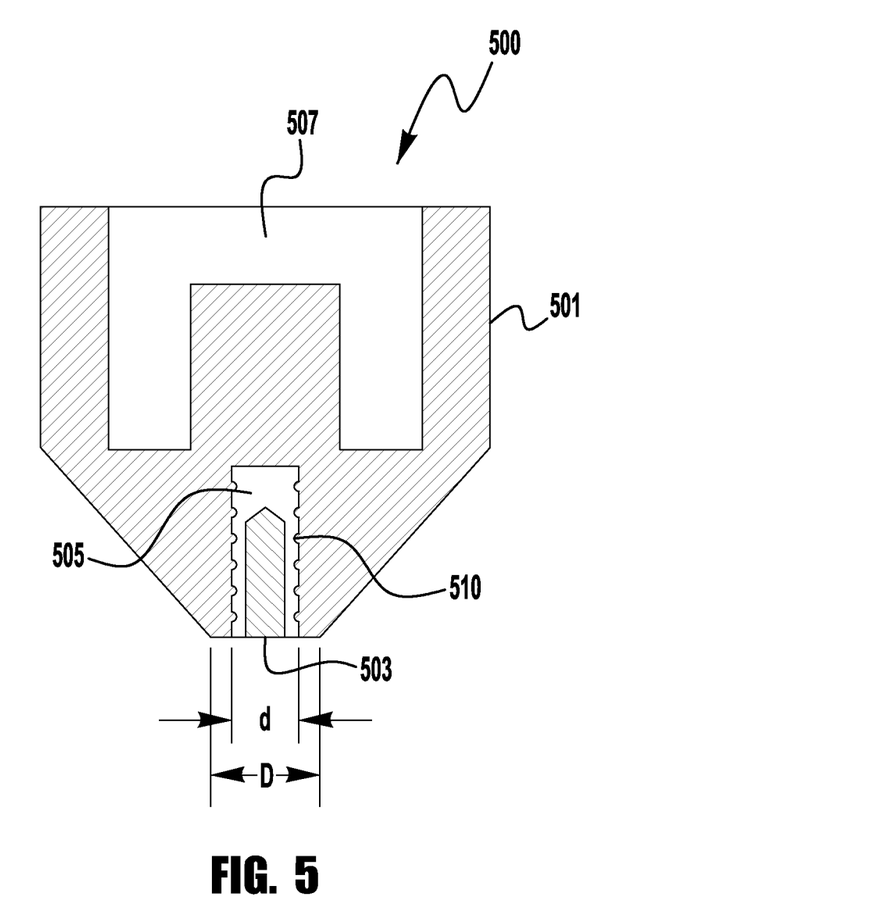
FIG. 5 is a diagrammatical representation of a further embodiment of the present invention.

In some exemplary embodiments, for example ones that are used with low current cutting operations, the shell may not need to have a stepped design. For example, as shown in FIG. 5, a further exemplary embodiment of an electrode 500 of the present invention is shown. As shown, in this embodiment the shell 505 has a generally cylindrical shape, and does not have a step as shown in the previous embodiments. The grooves 510 are used on the outer wall of the shell 505 as discussed above. Further, as with above embodiments, the insert 503 is positioned within the shell 505, which is inserted into the body 501 and the body is crimped onto the shell 505 such that the alloy of the body 501 flows into the grooves 510. Similarly, the body 501 has a cavity 507 for cooling as discussed above. Such an embodiment can be used in operations having generally low operational current levels. For example, this embodiment can be used in embodiments using cutting currents at or below 100 amps.

As discussed previously, many of the dimensional relationships discussed herein can be optimized for different operational current levels. This is reflected in the following where the following Table represents exemplary embodiments:

| Relationship | 100A & Below | 100A to 400A | 400A and above |
| --- | --- | --- | --- |
| d/d' | 0.2 to 0.3 | 0.9 to 1.1 | 0.9 to 1.1 |
| d/D | 0.6 to 0.75 | 0.8 to 0.98 | 0.8 to 0.98 |
| t/T | 0 to 0.5 | 0.75 to 0.9 | 0.8 to 0.95 |
| h/H | 0.5 to 1 | 0.65 to 0.8 | 0.55 to 0.7 |
| d"/d | 0.75 to 1 | 0.35 to 0.6 | 0.33 to 0.6 |

Additionally, the following Table represents further exemplary embodiments where the disclosed dimensional relationships are further optimized to provide significantly improved performance over known plasma torches:

| Relationship | 100A & Below | 100A to 400A | 400A and above |
| --- | --- | --- | --- |
| d/d' | 0.2 to 0.25 | 0.9 to 0.98 | 0.95 to 1 |
| d/D | 0.65 to 0.7 | 0.85 to 0.9 | 0.85 to 0.9 |
| t/T | 0 to 0.3 | 0.79 to 0.85 | 0.85 to 0.9 |
| h/H | 0.75 to 1 | 0.7 to 0.75 | 0.6 to 0.65 |
| d"/d | 0.85 to 1 | 0.4 to 0.5 | 0.38 to 0.45 |

By using the above dimensional relationships, along with the grooves as described herein, and combinations thereof, improved cooling and cutting performance can be achieved over known torches.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

I claim:

1. A cutting electrode assembly, comprising:
   an electrode body having a cooling cavity and a second cavity positioned at a distal end of the electrode body;
   a thermally conductive shell inserted into said second cavity, where said thermally conductive shell has an outer wall surface and a shell cavity with an opening at a distal end of said thermally conductive shell, wherein said thermally conductive shell has a first portion and said outer wall surface corresponds to said first portion and a second portion which has a second outer wall surface having a smaller diameter than said first portion; and
   a thermionic emissive insert positioned in said shell cavity,
   wherein said outer wall surface has a plurality of grooves which engage with said second cavity of said electrode body, such that at least some of a material which makes up said electrode body is inserted into said plurality of grooves,
   wherein said distal end of said electrode body has a flat surface with a diameter D, and where the outer wall surface has a diameter d, such that d is in a range of 80 to 98% of the diameter D, and
   wherein said cooling cavity has a distal end surface and a distance between the distal end surface of the cooling cavity and said electrode body has a thickness T between said cooling cavity distal end surface and the distal end of said electrode body, and a thickness t of said first portion of said shell is in a range of 75 to 95% of said thickness T.

2. The electrode assembly of claim 1, wherein said grooves have a depth in a range of 0.04 to 0.12 inches.

3. The electrode assembly of claim 1, wherein said grooves have a depth in a range of 0.005 to 0.008 inches.

4. The electrode assembly of claim 1, wherein said thermally conductive shell is made from silver.

5. The electrode assembly of claim 1, wherein the outer diameter of said outer wall surface is within a range of 90 to 110% of an inner diameter of said cooling cavity.

6. The electrode assembly of claim 1, wherein the outer diameter of said outer wall surface is within a range of 90 to 110% of an inner diameter of said cooling cavity,
   wherein said second portion of said shell has a height h such that the height h is in a range of 65 to 80% of an overall height H of the shell,
   wherein said second portion has an outer diameter d" such that the outer diameter d" is in a range of 35 to 60% of the diameter d, and
   wherein said electrode assembly is used for cutting operations having a cutting current in a range of 100 to 400 amps.

7. The electrode assembly of claim 1, wherein the outer diameter of said outer wall surface is within a range of 90 to 98% of an inner diameter of said cooling cavity,
   wherein said diameter d is in a range of 85 to 90% of the diameter D, and
   wherein said thickness t of said first portion of said shell is in a range of 79 to 85% of said thickness T,
   wherein said second portion of said shell has a height h such that the height h is in a range of 70 to 75% of an overall height H of the shell,
   wherein said second portion has an outer diameter d" such that the outer diameter d" is in a range of 40 to 50% of the diameter d, and
   wherein said electrode assembly is used for cutting operations having a cutting current in a range of 100 to 400 amps.

8. The electrode assembly of claim 1, wherein the outer diameter of said outer wall surface is within a range of 90 to 110% of an inner diameter of said cooling cavity,
   wherein said thickness t of said first portion of said shell is in a range of 80 to 95% of said thickness T,
   wherein said second portion of said shell has a height h such that the height h is in a range of 55 to 70% of an overall height H of the shell,
   wherein said second portion has an outer diameter d" such that the outer diameter d" is in a range of 33 to 60% of the diameter d, and
   wherein said electrode assembly is used for cutting operations having a cutting current of 400 amps or higher.

9. The electrode assembly of claim 1, wherein the outer diameter of said outer wall surface is within a range of 95 to 100% of an inner diameter of said cooling cavity,
   wherein said diameter d is in a range of 85 to 90% of the diameter D,
   wherein said thickness t of said first portion of said shell is in a range of 85 to 90% of said thickness T,
   wherein said second portion of said shell has a height h such that the height h is in a range of 60 to 65% of an overall height H of the shell,
   wherein said second portion has an outer diameter d" such that the outer diameter d" is in a range of 38 to 45% of the diameter d, and
   wherein said electrode assembly is used for cutting operations having a cutting current of 400 amps or higher.

10. A cutting torch; comprising:
    an electrode assembly mounted within the torch, where said electrode assembly comprises:
    an electrode body having a cooling cavity and a second cavity positioned at a distal end of the electrode body;
    a thermally conductive shell inserted into said second cavity, where said thermally conductive shell has an outer wall surface and a shell cavity with an opening at a distal end of said thermally conductive shell, wherein said thermally conductive shell has a first portion and said outer wall surface corresponds to said first portion and a second portion which has a second outer wall surface having a smaller diameter than said first portion; and
    a thermionic emissive insert positioned in said shell cavity,
    wherein said outer wall surface has a plurality of grooves which engage with said second cavity of said electrode body, such that at least some of a material which makes up said electrode body is inserted into said plurality of grooves,
    wherein said distal end of said electrode body has a flat surface with a diameter D, and where the outer wall surface has a diameter d, such that d is in a range of 80 to 98% of the diameter D, and
    wherein said cooling cavity has a distal end surface and a distance between the distal end surface of the cooling cavity and said electrode body has a thickness T between said cooling cavity distal end surface and the distal end of said electrode body, and a thickness t of said first portion of said shell is in a range of 75 to 95% of said thickness T.

11. The torch of claim 10, wherein said grooves have a depth in a range of 0.004 to 0.012 inches.

12. The torch of claim 10, wherein said grooves have a depth in a range of 0.005 to 0.008 inches.

13. The torch of claim 10, wherein said thermally conductive shell is made from silver.

14. The torch of claim 10, wherein the outer diameter of said outer wall surface is within a range of 90 to 110% of an inner diameter of said cooling cavity.

15. A method of making a cutting electrode assembly, comprising:
   providing an electrode body having a cooling cavity and a second cavity positioned at a distal end of the electrode body;
   providing a thermally conductive shell, where said thermally conductive shell has an outer wall surface and a shell cavity with an opening at a distal end of said thermally conductive shell, and where said outer wall surface is provided with a plurality of grooves, and further wherein said thermally conductive shell has a first portion and said outer wall surface corresponds to said first portion and a second portion which has a second outer wall surface having a smaller diameter than said first portion;
   inserting a thermionic emissive insert into said shell cavity;
   inserting said shell with said thermionic emissive insert into said second cavity of said electrode body, and
   providing a radially inward crimping force on an outside of said electrode body so as to reduce an outer diameter of said electrode body and cause at least some of said electrode body to fully enter into said plurality of grooves in said outer wall surface,
   wherein said distal end of said electrode body has a flat surface with a diameter D, and where the outer wall surface has a diameter d, such that d is in a range of 80 to 98% of the diameter D, and
   wherein said cooling cavity has a distal end surface and a distance between the distal end surface of the cooling cavity and said electrode body has a thickness T between said cooling cavity distal end surface and the distal end of said electrode body, and a thickness t of said first portion of said shell is in a range of 75 to 95% of said thickness T.

16. The method of claim 15, wherein said grooves have a depth in the range of 0.005 to 0.008 inches.

* * * * *